Oct. 11, 1960
W. S. FREDERIK
2,955,455
INSTRUMENT FOR MEASURING THE STATIC COEFFICIENT
OF FRICTION OF A SURFACE
Filed Dec. 30, 1957
2 Sheets-Sheet 1
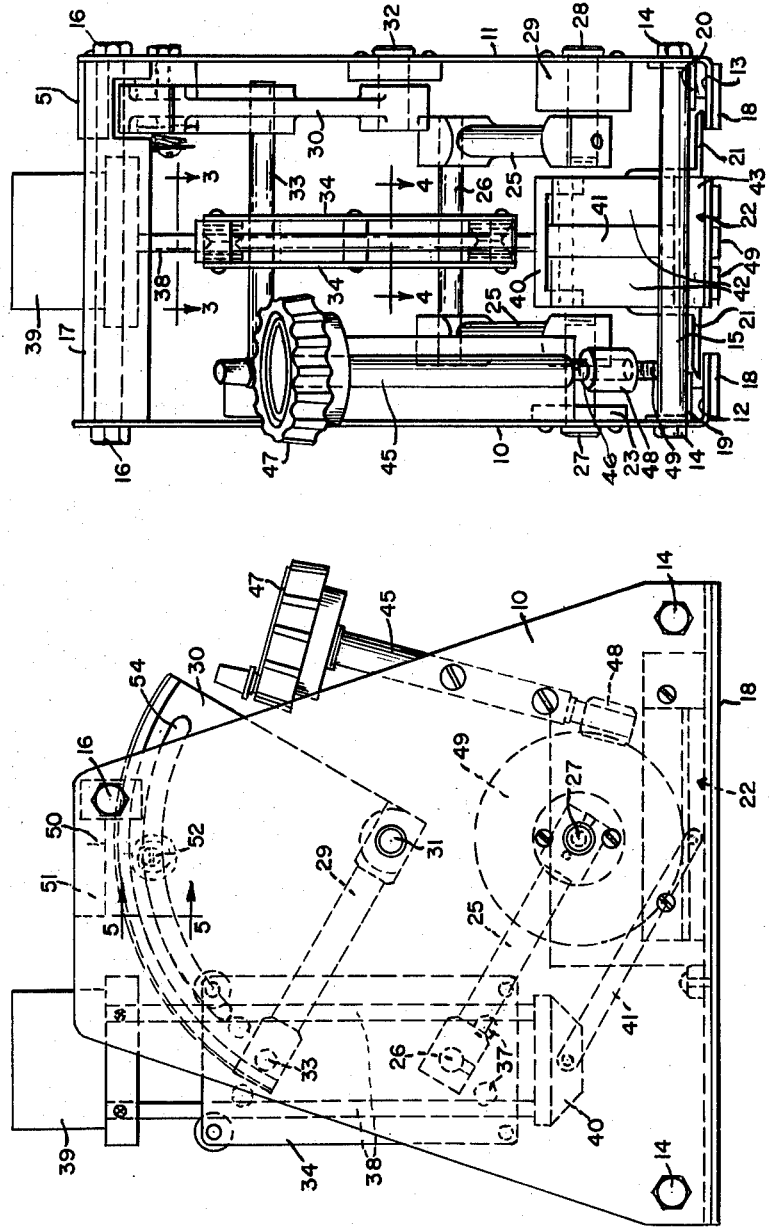
INVENTOR.
Willem S. Frederik
BY Oct. 11, 1960 W. S. FREDERIK 2,955,455
INSTRUMENT FOR MEASURING THE STATIC COEFFICIENT
OF FRICTION OF A SURFACE
Filed Dec. 30, 1957 2 Sheets-Sheet 2

INVENTOR.
Willem S. Frederik,
BY
Albert Sparan,
Attorney

United States Patent Office 2,955,455
Patented Oct. 11, 1960

2,955,455
INSTRUMENT FOR MEASURING THE STATIC COEFFICIENT OF FRICTION OF A SURFACE

Willem S. Frederik, 106 Suffolk Road, Wellesley, Mass.

Filed Dec. 30, 1957, Ser. No. 706,120

6 Claims. (Cl. 73—9)

The present invention relates to an instrument for measuring the static coefficient of friction of a surface.

As illustrative of uses of instruments in accordance with the invention, reference is made to the necessity of determining, in order to establish liability, whether a floor, stairs, or deck was sufficiently slippery to have been the cause of an accident, or whether a wax or polish, if applied to such surfaces, would cause them to be dangerously slippery. An instrument for such uses must be accurate and easily operated and it must be adaptable to portable embodiments to enable, for example, the surfaces of installations, rather than samples thereof, to be tested.

In accordance with the invention, these general objectives are attained by providing an instrument having a support to be positioned on the surface to be tested and having a slideway pivotally supported by a pair of vertically spaced, parallel arms pivotally attached to the support to swing upwardly and downwardly relative thereto to effect forward and rearward movement of the slideway at a predetermined angle. A weight, slidably supported by the slideway for movement relative thereto under the influence of gravity, is pivotally connected by a link that is also pivotally connected to an element slidably carried by the support for movement, along the surface to be slip-tested, forwardly and rearwardly relative to the support. The angle defined by the link and the subjacent surface depends on the forward-rearward position of the slideway determined by adjustable means connected to one of the arms and operable to swing it to cause its forward or rearward movements. Means are provided to indicate the angle, in terms of the static coefficient of friction, between the link and the surface and these include an indicia bearing part connected to one of the arms and readable with reference to a predetermined point represented by the maximum angle established by a predetermined forward elevated position of the slideway. As the adjusting means are actuated, the angle decreases until the surface-engaging element slips and its weight moves downwardly relative to the slideway. The static coefficient of friction of the surface being tested is then read by noting the position of the indicia bearing part in relation to the reference point.

In the accompanying drawings, there is shown an illustrative embodiment of the invention from which these and other of its objectives, novel features and advantages will be readily apparent.

In the drawings:

Fig. 1 is a side view of a device in accordance with the invention;

Fig. 2 is a view of the right hand end thereof, as seen in Fig. 1;

Figure 3:
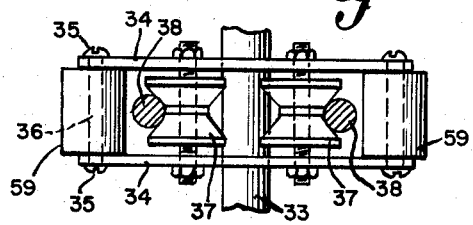
Fig. 3 is a top plan view of the slideway taken along the indicated lines 3—3 of Fig. 2.

In the embodiment of the invention shown in the drawings, a support is established by joining side walls 10 and 11 adjacent their inturned bottom edges 12 and 13, respectively, by means of screws 14 extending through the side walls and threaded into opposite ends of spacers 15. The walls 10 and 11 are also interconnected adjacent their tops by screws 16 threaded into the opposite ends of a spacing member 17. The inturned bottom edges 12 and 13 carry suitable anti-slip material indicated at 18.

Attached to the side walls 10 and 11 are members 19 and 20, respectively, spaced above and in parallel relationship with the corresponding inturned bottom edges thereof to define therewith transversely alined slideways for the flanges 21 of the surface engaging element, generally indicated at 22.

The side walls 10 and 11 have a first pair of transversely alined mounts 23 and 24, respectively. A pair of arms 25 are interconnected at one end by a rod 26 and the mounts 23 and 24 have pivots 27 and 28, respectively, to each of which the other end of an appropriate one of the arms 25 is attached. An arm 29, of the same length as the arm 25, and a quadrant 30 are mounted on pivots 31 and 32, respectively, each spaced vertically from a respective one of the pivots 27 and 28. The other end of the arm 29 is connected to the quadrant 30 by a rod 33.

Figure 4:
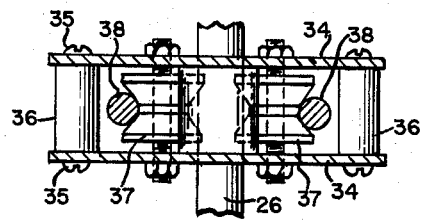
Fig. 4 is a section through the slideway taken approximately along the indicated lines 4—4 of Fig. 2.

A slideway is provided that has a pair of walls 34 joined together by screws 35 extending therethrough and into opposite ends of spacers 36, see Figs. 3 and 4. The two rods 26 and 23 are rotatably supported by the slideway walls and are vertically spaced apart a distance equal to that between the two pairs of pivots. The slideway has two series of guides each consisting of two vertically spaced rotatable guide members 37. Each series of guide members 37 slidably guides an appropriate one of two rods 38 supporting, at their upper ends, a weight 39 and joined at their lower ends by a base 40 to which is pivoted one end of a link 41.

The surface engaging element 22 is shown as consisting of a pair of members 42 connected to a base 43 to which the other end of the link 41 is pivotally joined. Each of the members 42 carries one of the slideway entering flanges 21 and the slideways are so dimensioned as to so loosely receive the flanges 21 as to enable the element 22 to move upwardly and downwardly relative to the support. The base 43 has suitable pads 44 disposed for engagement with the surface to be tested. For this purpose, leather is used as being presently the best material on which to rely on making tests as to the critical coefficient of friction of a tread surface.

From the foregoing, it will be apparent that the weight on the slide element 22 becomes operative when the angle between the link 41 and the surface under test is so reduced that the element 22 slips. For effecting changes in this angle, there is provided a mount 45 for the shaft 46 provided at its upper end with a hand wheel 47 and at its lower end with a worm 48 in mesh with a gear 49 fast on the pivot 27.

The quadrant 30 is provided with suitable indicia for indicating the static of coefficient of friction in terms of the angle between the link 41 and the surface to be tested. A marker 50 carried by the transparent block 51 carried by the wall 11 is used in reading the indicia on the quadrant 30.

Figure 5:
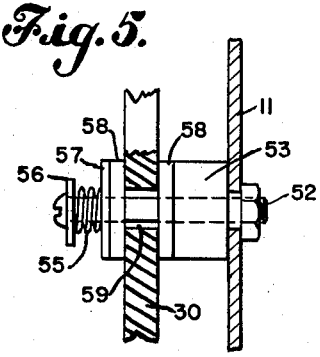
Fig. 5 is a fragmentary and partly sectioned view, also on an increased scale, taken along the indicated lines 5—5 of Fig. 1.

A screw 52, see Fig. 5, carried by the wall 11 extends through a spacer 53 and freely through an arcuate slot 54 in the quadrant 30. A spring 55 compressed between washers 56 and 57 exerts clamping pressure on the clamping discs 58 of which there is one on each side of the quadrant 30. In use, the tension of the spring 55 is so adjusted as to prevent unwanted movement of the quadrant 30.

In use, the instrument is placed on the surface to be tested and the slideway is so elevated that the angle between the link 41 and the test surface does not permit the element 22 to slip in response to the total effective weight thereon with the weight 39 in its elevated position as best illustrated by Fig. 1. Usually, of course, the slideway is elevated to a maximum extent and the hand wheel 47 is then rotated until the element 22 slips on the test surface and this slippage is, of course, attended by downward movement of the weight 39 and its rods 38 relative to the slideway. The indicia immediately below the marker 50 gives the critical static coefficient of friction of the test surface. To cushion the contact between the weight 39 and the upper end of the slideway, it is preferred that the uppermost spacer 36 be provided with a sleeve 59 of rubber or other suitable cushioning material dimensioned to protrude above slideway walls 34.

What I therefore claim and desire to secure by Letters Patent is:

1. In an instrument for measuring the coefficient of friction of a surface, a support to rest on said surface, a slideway, a pair of parallel, vertically spaced supporting arms pivotally connected to said support and to said slideway to swing upwardly and downwardly to effect forward and rearward movement of said slideway relative to said support, a weight slidable in said slideway under the influence of gravity, a friction element slidably carried by said support for movement along said surface in frictional engagement therewith forwardly and rearwardly relative to said support, a link pivotally connected to said weight and to said element at an angle relative to said element and to said surface that depends upon the forward-rearward position of said slideway, measuring means, including a part connected to one of said arms, to indicate the angle between said arms and said surface as it decreases on rearward movement of said slideway with reference to a predetermined forward position thereof, the angle between said arms and said surface at which said element slips thereon being an indication of the frictional coefficient, and means connected to one of said arms to swing it in one direction or the other to effect said forward-rearward movements.

2. In an instrument for measuring the coefficient of friction of a surface, a support to rest on said surface, a slideway, a pair of parallel, vertically spaced supporting arms pivotally connected to said support and to said slideway to swing upwardly and downwardly to effect forward and rearward movement of said slideway relative to said support, a weight slidable in said slideway under the influence of gravity, a friction element slidably carried by said support for movement along said surface in frictional engagement therewith forwardly and rearwardly relative to said support, a link pivotally connected to said weight and to said element at an angle relative to said element and to said surface that depends upon the forward-rearward position of said slideway, measuring means, including a part connected to one of said arms to indicate the angle between said arms and said surface as it decreases on rearward movement of said slideway with reference to a predetermined forward position thereof, the angle between said arms and said surface at which said element slips thereon being an indication of the frictional coefficient, brake means opposing movement of said part, and means connected to one of said arms to swing it in one direction or the other to effect said forward-rearward movements.

3. In an instrument for measuring the coefficient of friction of a surface, a support to rest on said surface, a slideway, a pair of parallel, vertically spaced supporting arms pivotally connected to said support and to said slideway to swing upwardly and downwardly to effect forward and rearward movement of said slideway relative to said support, a weight slidable in said slideway under the influence of gravity, a friction element slidably carried by said support for movement along said surface in frictional engagement therewith forwardly and rearwardly relative to said support, a link pivotally connected to said weight and to said element at an angle relative to said element and to said surface that depends upon the forward-rearward position of said slideway, measuring means including a quadrant connected to one of said arms bearing indicia related to a predetermined forward position of said slideway, and a reference marker on said support readable with reference to said indicia, the angle between said arms and said surface at which said element slips thereon being an indication of the frictional coefficient, and means connected to the other of said arms to swing it in one direction or the other to effect said forward-rearward movements.

4. In an instrument for measuring the coefficient of friction of a surface, a support to rest on said surface, a slideway, a pair of parallel, vertically spaced supporting arms pivotally connected to said support and to said slideway to swing upwardly and downwardly to effect forward and rearward movement of said slideway relative to said support, a weight slidable in said slideway under the influence of gravity, a friction element slidably carried by said support for movement along said surface in frictional engagement therewith forwardly and rearwardly relative to said support, a link pivotally connected to said weight and to said element at an angle relative to said element and to said surface that depends upon the forward-rearward position of said slideway, measuring means, including an adjustable friction coupling connected to one of said arms, to indicate the angle between said element and said surface as it decreases on rearward movement of said slideway with reference to a predetermined forward position thereof, the angle between said arms and said surface at which said element slips thereon being an indication of the frictional coefficient, and means connected to one of said arms to swing it in one direction or the other to effect said forward-rearward movements.

5. In an instrument for measuring the coefficient of friction of a surface, a support to rest on said surface, a slideway, a pair of parallel, vertically spaced supporting arms pivotally connected to said support and to said slideway to swing upwardly and downwardly to effect forward and rearward movement of said slideway relative to said support, a weight slidable in said slideway under the influence of gravity, a friction element slidably carried by said support for movement along said surface in frictional engagement therewith forwardly and rearwardly relative to said support, a link pivotally connected to said weight and to said element at an angle relative to said element and to said surface that depends upon the forward-rearward position of said slideway, and measuring means, including a part connected to one of said arms, to indicate the angle between said element and said surface with reference to a predetermined forward position thereof, the angle at which slippage occurs being an indication of the frictional coefficient.

6. In an instrument for measuring the co-efficient of friction of a surface, a support to rest on said surface, a slideway, a pair of parallel, vertically spaced supporting arms pivotally connected to said support and to said slideway to swing vertically to effect forward and rearward movement of said slideway relative to said support, a weight slidable in said slideway under the influence of gravity, a friction element slidably carried by said support in frictional engagement therewith for movement along said surface forwardly and rearwardly relative to said support, a link pivotally connected to said weight and to said element at an angle relative to said element and to said surface that depends upon the forward-rearward position of said slideway, measuring means including a quadrant, an adjustable friction coupling between said quadrant and one of said arms, and a reference marker on said support to indicate with reference to said quadrant the angle between said element and said surface as it decreases on rearward movement of said slideway with reference to a predetermined forward position thereof, the angle between said arms and said surface at which said element slips thereon being an indication of the frictional coefficient, and means connected to the other of said arms to swing it in one direction or the other to effect said forward-rearward movements.

References Cited in the file of this patent

Journal of Scientific Instruments, vol. 30, #10, "A Simple Direct-reading Friction Meter," by V. E. Gough, October 1953 (pages 345–349 only).

"A Method of Measuring Frictional Coefficients of Walkway Materials," by R.B. Hunter, a reprint from Bureau of Standards Journal of Research, vol. 5, August 1930.